(12) United States Patent
Dawley

(10) Patent No.: US 9,489,026 B2
(45) Date of Patent: Nov. 8, 2016

(54) SELECTIVE EVENT REACTION PROCESSING IN POWER CONTROL

(71) Applicant: Electronic Systems Protection, Inc., Knightdale, NC (US)

(72) Inventor: Robert A. Dawley, Clayton, NC (US)

(73) Assignee: Electronic Systems Protection, Inc., Knightdale, NC (US)

( * ) Notice: Subject to any disclaimer, the term of this patent is extended or adjusted under 35 U.S.C. 154(b) by 181 days.

(21) Appl. No.: 14/540,117

(22) Filed: Nov. 13, 2014

(65) Prior Publication Data

US 2016/0139644 A1    May 19, 2016

(51) Int. Cl.
G06F 1/26      (2006.01)
G06F 1/30      (2006.01)
H02H 3/00      (2006.01)
H02H 3/093     (2006.01)
H02H 3/20      (2006.01)

(52) U.S. Cl.
CPC .............. *G06F 1/30* (2013.01); *H02H 3/006* (2013.01); *H02H 3/093* (2013.01); *H02H 3/207* (2013.01)

(58) Field of Classification Search
CPC ................................. G06F 1/26; H02H 3/006
See application file for complete search history.

(56) References Cited

U.S. PATENT DOCUMENTS

| | | | |
|---|---|---|---|
| 4,694,373 A | 9/1987 | Demeyer | |
| 4,870,528 A | 9/1989 | Harford | |
| 4,870,534 A | 9/1989 | Harford | |
| 5,101,316 A | 3/1992 | Levain | |
| 5,136,455 A | 8/1992 | Billingsley | |
| 8,482,885 B2 | 7/2013 | Billingsley et al. | |
| 2013/0073060 A1 | 3/2013 | Dawley et al. | |
| 2015/0333509 A1* | 11/2015 | Jankowski | G01R 1/36 361/35 |

FOREIGN PATENT DOCUMENTS

EP    2555004 A1    2/2013

OTHER PUBLICATIONS

European Search Report in corresponding European Application No. 15194407.01, mailed on Mar. 22, 2016.

* cited by examiner

*Primary Examiner* — Albert Wang
(74) *Attorney, Agent, or Firm* — Edell, Shapiro & Finnan LLC

(57) ABSTRACT

A reaction mode is selected through a user interface from a plurality of reaction modes that includes a fast reaction mode, by which each of a plurality of values assigned to a process variable over time are individually evaluated in an event decision that asserts an occurrence of a power event. The reaction modes also include a slow reaction mode by which none of the values assigned to the process variable over time are individually evaluated in the event decision. Measurements of a signal monitored by a power controller are assigned to the process variable as its values. The event decision evaluates the process variable values against an event boundary in accordance with the selected reaction mode. A transition between conducting and non-conducting states in a switch circuit is compelled in response to the occurrence of the power event as determined from the event decision.

20 Claims, 7 Drawing Sheets

SELECTIVE EVENT REACTION PROCESSING IN POWER CONTROL

BACKGROUND

Surge protection devices (SPDs) are typically designed to monitor input electrical power and to rapidly remove such power, such as by automatic operation of a switch device, from internal and externally connected load circuits in response to overvoltage and/or undervoltage conditions, wiring faults, etc. Depending on the implementation, the response time with which SPDs can interrupt delivery of electrical power is typically very fast, e.g., about 20 ms measured from the onset of a power event, such as an overvoltage event.

Certain conventional SPDs provide mechanisms that allow a user to set thresholds by which overvoltage/undervoltage events are defined, but do not allow the user to control the aggressiveness with which such undervoltage/overvoltage power events precipitate a device shutdown. Accordingly, low energy switching voltage transients, such as those that occur during power cycling of specific types of connected equipment (cooling fans, for example), can cross a user-defined voltage threshold and cause unintended power interruptions.

SUMMARY

A reaction mode is selected from a plurality of reaction modes through a user interface. The reaction modes include a fast reaction mode by which each of a plurality of values assigned to a process variable over time are individually evaluated in an event decision that asserts an occurrence of a power event in a power controller. The reaction modes also include a slow reaction mode by which none of the values assigned to the process variable over time are individually evaluated in the event decision that asserts the occurrence of the power event. Measurements of a signal monitored by the power controller are assigned to the process variable as its values. The event decision evaluates the process variable values against an event boundary in accordance with the selected reaction mode. A transition between conducting and non-conducting states in a switch circuit is compelled in response to the occurrence of the power event as determined from the event decision.

DETAILED DESCRIPTION

Figure 1:
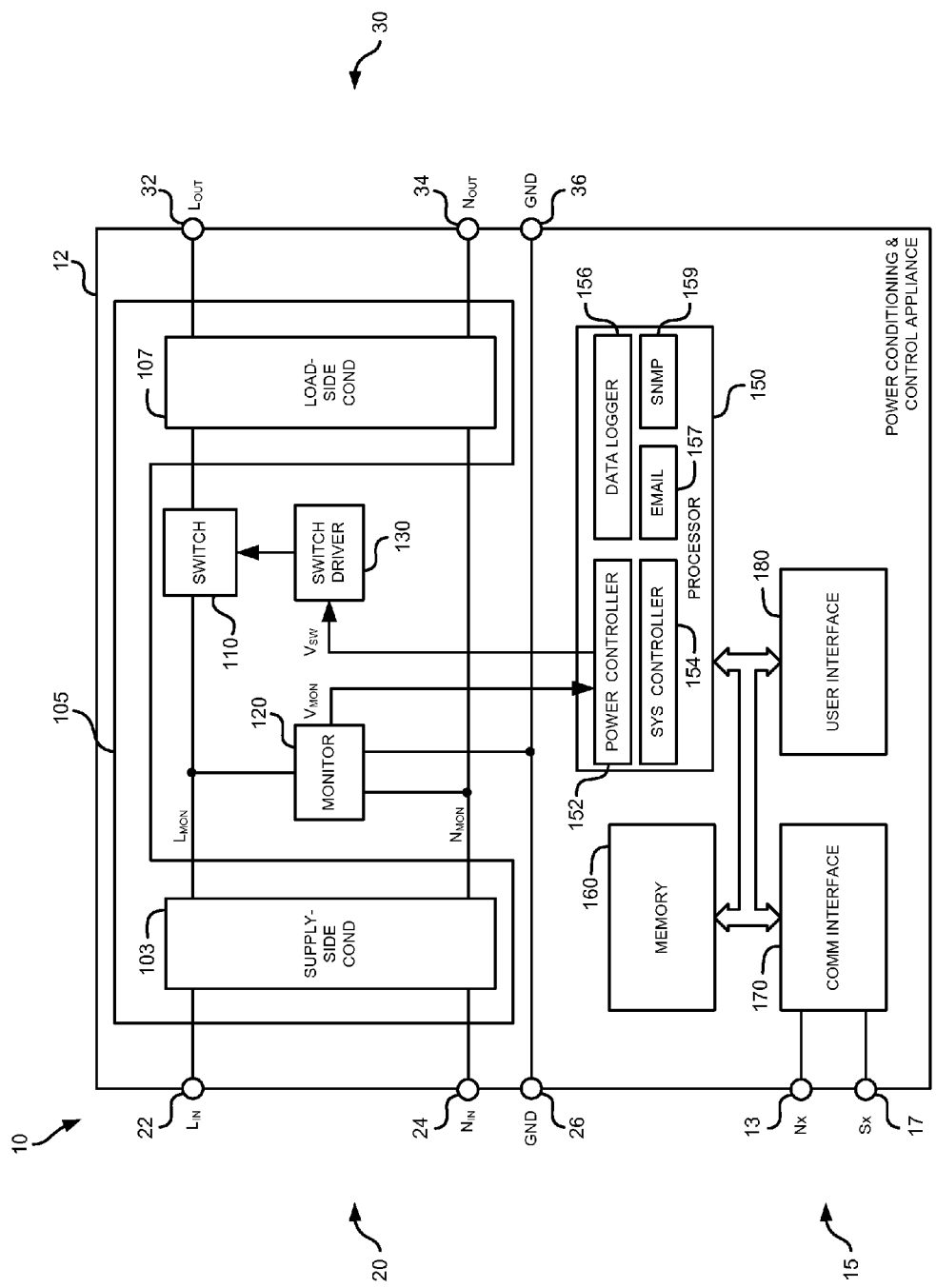
FIG. 1 is a schematic block diagram of a power conditioning and control appliance by which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

The figures described herein include schematic block diagrams illustrating various functional modules for purposes of description and explanation. Such diagrams are not intended to serve as electrical schematics and interconnections illustrated are merely to depict various interoperations between functional components and/or processes and are not necessarily direct electrical connections between such components. Moreover, the functionality illustrated and described via separate components need not be distributed as shown, and the discrete blocks in the diagrams are not intended to depict discrete electrical components.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

FIG. 1 is a schematic block diagram of an exemplary power conditioning and control appliance (PCCA) 10 by which the present invention can be embodied. Exemplary PCCA 10 is an electrical circuit intended to be electrically interposed between an electrical source (not illustrated) and an electrical load (not illustrated) to improve power quality at the load and to protect both the load and internal PCCA components against various conditions where input electricity exceeds tolerances. It is to be understood that the functional blocks of which exemplary PCCA 10 is comprised are conceptual and are not intended to represent specific, individual components or hard functional boundaries. Rather, separation of power conditioning and control functionality into the blocks illustrated in FIG. 1 is intended solely to facilitate efficient description of an exemplary embodiment of the present invention. Indeed, the functionality of the separate modules illustrated in FIG. 1 may be combined, divided, and otherwise repartitioned into other modules, essentially without limitation. Additionally, components other than and/or in addition to those illustrated in and described herein may be incorporated into PCCA 10. Upon review of this disclosure, those having skill in the power conditioning and control arts will recognize numerous configurations in which PCCA 10 may be realized without departing from the spirit and intended scope of the present invention.

Exemplary PCCA 10 accepts AC input electricity through an input port, generally illustrated at input port 20, and may provide conditioned AC output electricity through an output port, generally illustrated at output port 30. AC power conditioning may be achieved by a suitable power conditioning circuit 105 constructed or otherwise configured to filter out noise, e.g., electromagnetic interference (EMI) noise and radio-frequency interference noise (RFI), and to limit, divert and/or dissipate high energy transients and surges. Conditioning circuit 105 may include a source-side conditioner 103 and a load-side conditioner 107 comprising suitable filtering, clamping and diverter circuits and components including inductors, capacitors, varistors, silicon avalanche diodes and semiconductor switching components (SCRs, triacs, MOSFETs, etc.) suitably distributed to provide input and output electrical filtering and suppression of normal and common mode transients. One or both of source-side conditioner 103 and load-side power conditioner 107 may comprise shunt energy suppressor components to divert the energy of normal and common mode transients to the ground or neutral conductor. Additionally or alternatively, one or both of source-side power conditioner 103 and load-side power conditioner 107 may comprise series energy suppressor components to dissipate (as opposed to diverting) or limit the transient energy. Circuitry suitable for use in power conditioning circuit 105 is disclosed in U.S. Pat. No. 4,870,528, entitled "Power Line Surge Suppressor," and issued on Sep. 26, 1989, U.S. Pat. No. 4,870,534, entitled, "Power Line Surge Suppressor," and issued on Sep. 26, 1989, and U.S. Pat. No. 5,136,455, entitled, "Electromagnetic Interference Suppression Device," issued on Aug. 4, 1992, all of which are incorporated herein by reference in their respective entireties.

Conditioned AC power may be selectively provided to load equipment connected at output port 30 through one or more switch circuits 110, which may be compelled into respective conducting and non-conducting states in accordance with a state of a switch signal $V_{SW}$. In certain embodiments, output port 30 may comprise separate connectors (not illustrated), each comprising corresponding terminals 32, 34 and 36, at which respective electrical loads may be connected. When so embodied, electricity to each such connector may be independently controlled by its own switch circuit 110. An example of such a configuration is described in U.S. patent application Ser. No. 13/618,306, filed at the U.S. Patent and Trademark Office on Sep. 14, 2012 and entitled, "Power-centric System Management," the full disclosure of which is incorporated herein, in its entirety, by reference.

Switch circuit 110 may be compelled into its conducting state when switch signal $V_{SW}$ is in a "powered" state and may be compelled into its non-conducting state when switch signal $V_{SW}$ is in a "shutdown" state. Switch signal $V_{SW}$ may be provided to a suitable switch driver circuit 130, in response to which switch driver circuit 130 produces sufficient voltage and current to operate switch circuit 110. Switch circuit 110 may be implemented by a hybrid switch that ameliorates power switching artifacts and/or undergoes state transitions at AC zero crossings. One such switch is described in U.S. Pat. No. 8,482,885 entitled, "Hybrid Switch Circuit," and issued on Jul. 9, 2013, which is incorporated herein by reference in its entirety. It is to be understood, however, that the present invention is not limited to any particular switch architecture, as the skilled artisan will appreciate upon review of this disclosure.

PCCA 10 may include a processor 150 to implement, among other things, system coordination and control, signal and data processing, numeric computation operations, and other functions by which the circuits and subsystems of PCCA 10 operate and interoperate. For purposes of description, exemplary processor 150 realizes a power controller 152 to, among other things, control the provision of output electricity to electrical loads connected to output port 30, and a system controller 154 to, among other things, coordinate and control interoperating functional components of PCCA 10, and to interact with external agents, e.g. human users and terminal equipment. In certain embodiments, processor 150 may also implement a data logger process 156 by which system- and user-defined events are logged, an email service 157 to format and transmit event and status email messages, and a simple network management protocol (SNMP) service 159 to, among other things, realize event driven and/or event related SNMP traps.

Processor 150 may be realized through a wide variety of processing and interface circuitry including, but not limited to analog-to-digital converter circuits, digital-to-analog converter circuits, fixed digital logic circuits, programmable digital logic circuits, application specific circuits, etc., to implement, among other components, general data processors, data-specific processors, signal converters and conditioners, analog and digital signal processors, and so on.

As used herein, one or more "process variables" establish the system state of PCCA 10 and are assigned values over time from measured quantities, e.g., measurements of input voltage level, input current level, output voltage level, output current level, power consumption, input connection polarity, temperature, humidity, external signal level, etc. PCCA 10 transitions between various system states in accordance with criteria established on the process variables. For example, numerical bounds may be established on process variables, either by hard-coded mechanisms in PCCA 10 and/or by user interaction through user interface 180, to protect sensitive system functions and/or connected equipment that would be impaired if such process variable bounds were to be exceeded.

Power controller 152 may receive one or more signals from monitor 120, each signal indicating a potentially time-varying quantity assigned to a process variable. Monitor 120 may, for example, obtain sequential voltage measurements between AC line and neutral voltages $L_{MON}$ and $N_{MON}$, respectively, and may provide the resulting voltage measurements $V_{MON}$ to power controller 152. Power controller 152 may evaluate the voltage measurements against criteria established on the associated input voltage process variable to determine whether a power event has occurred. As used herein, a "power event" occurs when values assigned to a process variable meet event conditions established therefor. In response to a power event, power controller 152 may generate a corresponding power control signal $V_{SW}$ by which switch 110 is controlled into a corresponding conducting or non-conducting state. In certain embodiments, the manner in which power controller 152 asserts the occurrence of a power event for a set event condition is user-selectable. That is, power controller 152 may assess a process variable against a power event condition in accordance with one of different, user-selected "reaction modes" that define responsiveness in state transitions to power events. These aspects of the present invention are described in more detail below.

It is to be understood that while monitor 120 is illustrated in FIG. 1 as monitoring only input voltage $V_{MON}$, other process variables of PCCA 10 may be monitored by monitor 120 from which occurrences of power events can be ascertained. That is, certain embodiments provide for occurrences of power events to be conditioned on process variables other than input voltage, e.g., current, power consumption, temperature, DC input voltage (in DC power systems), non-sinusoidal signals provided from external equipment, etc.

Exemplary user interface 180 is constructed or otherwise configured to implement various user controls by which an operator of PCCA 10 can, among other things, set various power quality and control parameters. User interface 180 may include a local interface, such as a control panel, through which PCCA operations can be monitored and certain functionality controlled. Additionally or alternatively, user interface 180 may be implemented as a remotely-accessible graphical user interface (GUI), such as through a web server (not illustrated) operating in conjunction with communication interface 170. The skilled artisan will recognize numerous local and remote interface mechanisms that can be used with the present invention without departing from the spirit and intended scope thereof. Examples of such mechanisms are described in the aforementioned U.S. patent application Ser. No. 13/618,306.

Memory 160 provides general and specific-purpose storage for PCCA 10, such as to store GUI components, e.g., image files and Hypertext Markup Language (HTML) encoded Web pages, as well as various system settings and data. Memory 160 may also store incident/event logs and/or diagnostic data that can be recovered or otherwise accessed through communication interface 170. Additionally, memory 160 may store processor instructions that, when executed by processor 150, causes processor 150 to perform its various functions. Memory 160 may include electrical, magnetic and/or optical storage media and associated access mechanisms including, but not limited to electronic random access and/or read-only memory, flash memory, hard disk drive memory, compact disk memory and digital versatile disk memory to implement, among other things, executable code storage, application data storage, instruction and data registers, and instruction and data caches.

Communication operations implemented by PCCA 10 may be performed by communication interface 170, which may be constructed or otherwise configured for network communications Nx, e.g., Ethernet, Wi-Fi, cellular, etc., and for serial communications Sx, e.g., Universal Serial Bus (USB), RS-232, etc. Communication interface 170 may be realized through suitable circuitry, including fixed analog and digital circuits, programmable logic and combinations thereof, that implement any and all signaling interfaces, signal processing, data conversion and data processing necessary to carry out communications on a communications network in accordance with one or more communication network protocols. The present invention is not limited to any particular communication media, signal type or protocol; those having skill in the art will recognize numerous communication techniques that can be used in conjunction with the present invention, as disclosed herein, without departing from the spirit and intended scope of the inventive concept.

Processor 150, memory 160, communication interface 170 and user interface 180 may be provided operating power by a suitable power supply (not illustrated). The present invention is not limited to a particular power supply implementation, which will vary in construction with the context in which PCCA 10 is designed to operate. In certain embodiments, power supply 105 is realized in linear- or switched-mode power supply architectures which receive conditioned AC power from power conditioning circuit 105.

The circuitry of PCCA 10 may be assembled on a common chassis or housed in a common housing generally illustrated at boundary 12, which will be referred to herein as housing 12. Housing 12 may be suitably constructed, such as by various conductive components, to shield the enclosed circuitry against EMI/RFI noise. In certain embodiments, housing 12 is constructed to be mounted in a larger structure, such as an equipment rack. Input electrical terminals for line conductor $L_{IN}$, illustrated at terminal 22, neutral conductor $N_{IN}$, illustrated at terminal 24 and ground conductor GND, illustrated at terminal 26, may be disposed on the exterior of housing 12 as well as output electrical terminals for line conductor $L_{OUT}$, illustrated at terminal 32, neutral conductor $N_{OUT}$, illustrated at terminal 34 and ground conductor GND, illustrated at terminal 36. In certain embodiments, input port 20 may be assembled at the end of a power cable to include the foregoing input terminals 22, 24 and 26. Additionally, as discussed above, certain embodiments may include more than one connector at output port 30, each including corresponding output terminals 32, 34, 36. Communication port connectors may also be disposed on housing 12, such as by one or more suitable network connectors 13, e.g., RJ-45, as well as by one or more suitable serial bus connectors 17, e.g., RS-232 or Universal Serial Bus (USB) connectors. Other components may be accessible from outside housing 12 as well, such as control and display panel components of a local user interface (not illustrated), visual and/or audio alarm annunciators, etc.

Exemplary PCCA 10 illustrated in FIG. 1 is but one possible power conditioning and control system in which the present invention can be embodied. Another possibility is described in the aforementioned U.S. patent application Ser. No. 13/618,306. Upon review of the present application and its incorporated documents, those having skill in the power conditioning and control technical arts will recognize other implementations in which the present invention can be embodied without departing from the spirit and intended scope thereof.

Figure 2:
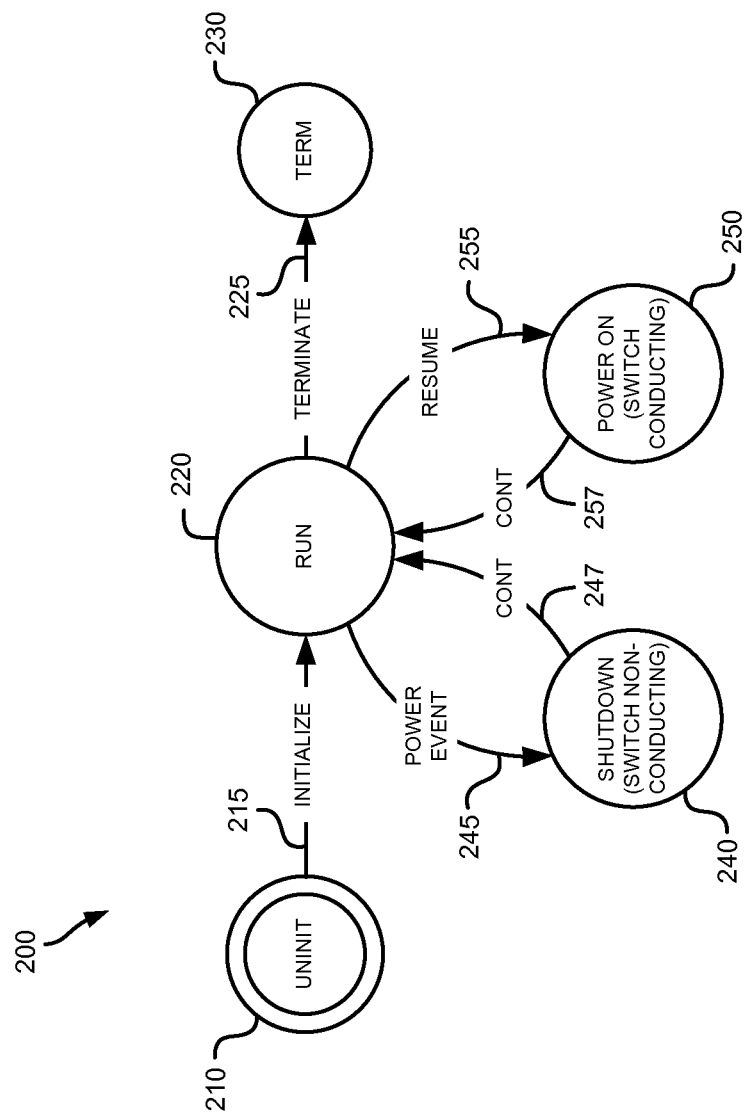
FIG. 2 is a diagram of a state machine by which the present general inventive concept may be embodied

FIG. 2 is a graphical representation of an exemplary state machine 200 by which operation of an exemplary power controller 152 can be demonstrated. In the diagram of FIG. 2, operational states of power controller 152 are represented by the circular nodes and events compelling transitions between states are represented by the directed line segments. Exemplary state machine 200 is instantiated in an uninitialized state 210 and transitions into run state 220 upon the occurrence of an initialize event 215, such as when all system variables and functions have been suitably initialized. While in run state 220, power controller 152 assesses monitored process variables against power event conditions established therefor. Upon the occurrence of a power event 245 in response to, for example, an overvoltage, undervoltage, over-temperature, or other potentially damaging or unsafe condition, state machine 200 may transition into a shutdown state 240. In shutdown state 240, power controller 152 may generate switch control signal $V_{SW}$ in a shutdown state, in response to which switch 110 is compelled into a non-conducting, or "open" state by which electrical power is removed from any load equipment connected to output port 30. A continue event 247 may occur in response to completion of the removal of power, which may compel state machine 200 to transition back into run state 220. Once power controller 152 has returned to its run state 220, process variables are once again monitored and assessed to determine the occurrence of another power event. Upon the occurrence of a resume power event 255, which occurs when, for example, the condition under which the original power event occurred is no longer in effect or has otherwise been cleared, state machine 200 may transition into power on state 250. In power on state 250, power controller 152 may provide switch signal $V_{SW}$ to switch 110 (through switch driver 130) in a powered state, in response to which switch 110 is compelled into a conducting, or "closed" state by which electrical power is provided to the load equipment connected to output port 30. Continue event 257 may occur upon completion of the provision of power, in response to which state machine 200 may transition back to run state 220, in which power controller 152 continues process variable assessment operations. In response to a terminate event 225, which may occur when the user issues a "power off" command or when PCCA 10 is disconnected from the AC power source, state machine 200 may transition into a terminal state 230.

Figure 3:
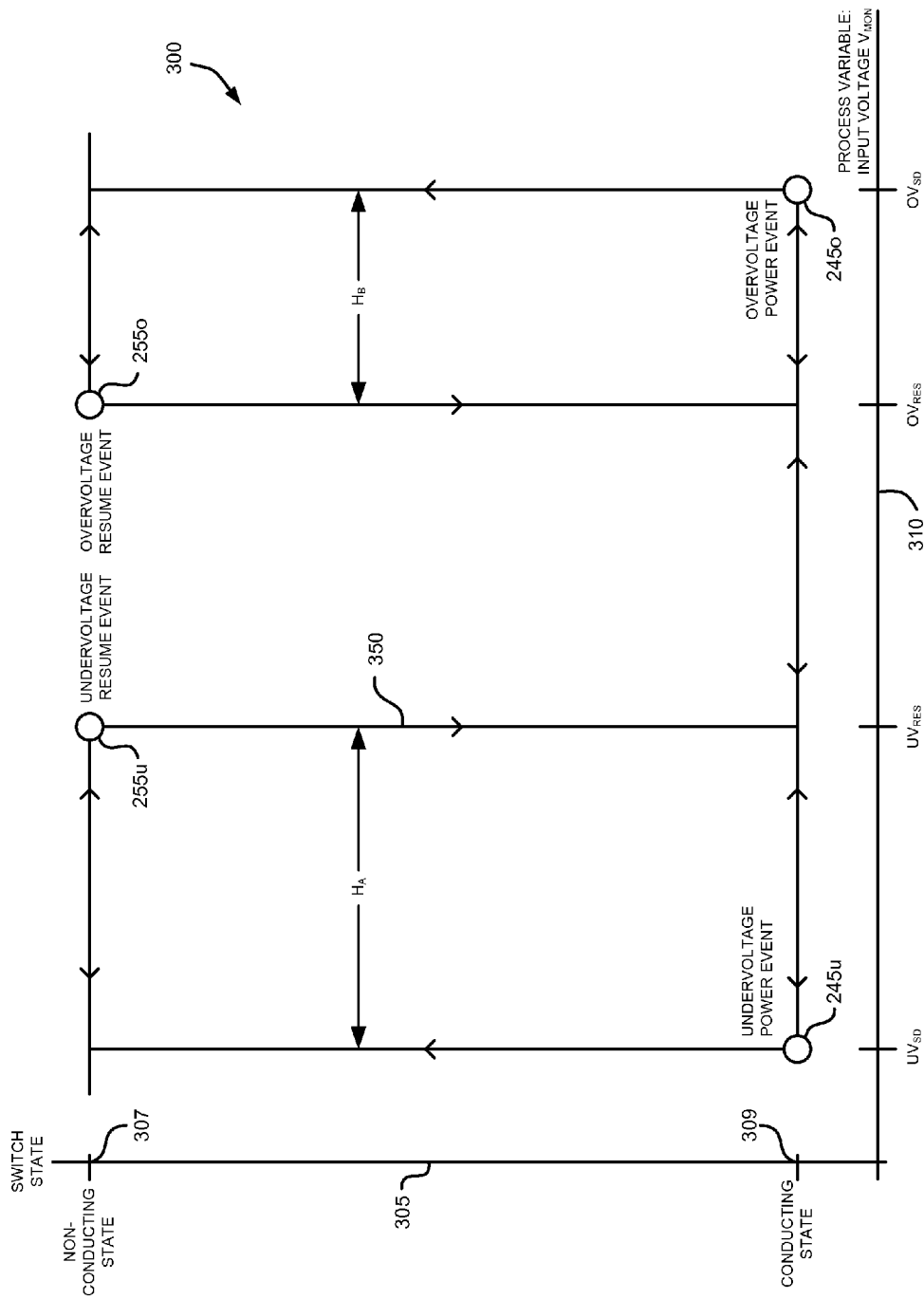
FIG. 3 is a diagram of an example process variable/state space for purposes of describing state transitions in embodiments of the present general inventive concept.

FIG. 3 is a conceptual diagram illustrating an exemplary process variable/state (PV/State) space 300 in which changes in state 305 of switch circuit 110 occur at selected boundaries on a process variable 310. While power controller 152 may be configured to process and operate on any number of process variables, the process variable of PV/State space 300 is, for purposes of description and not limitation, the monitored input voltage $V_{MON}$.

As illustrated in FIG. 3, changes in switch state 305 occur in PV/State space 300 where a process variable 310, i.e., $V_{MON}$ attains specified values referred to herein as "power event boundaries," or simply event boundaries. Event boundaries may be defined through, for example, process boundary conditions on $V_{MON}$. For example, undervoltage event boundary $UV_{SD}$ may correspond to a minimum input voltage threshold below which operation of PCCA 10 or connected electrical loads is proscribed. When $V_{MON}$ meets or falls below $UV_{SD}$, power controller 152 may assert a power event 245u, in response to which switch circuit 110 is compelled into a non-conducting state 307. Similarly, overvoltage event boundary $OV_{SD}$ may correspond to a maximum input voltage threshold above which operation of PCCA 10 or connected electrical loads is proscribed. When $V_{MON}$ meets or exceeds $OV_{SD}$, power controller 152 may assert a power event 245o, in response to which switch circuit 110 is compelled into a non-conducting state 307. When PCCA 10 is operating nominally, i.e., when the $V_{MON}$ is between $UV_{RES}$ and $OV_{RES}$, switch circuit 110 may be placed in a conducting state 309, in which the load is connected to the power source connected at input port 20.

Power controller 152 may assert a resume event 255u when $V_{MON}$ meets or exceeds undervoltage threshold boundary $UV_{RES}$, in response to which switch circuit 110 may be compelled into conducting state 309. Similarly, resume event 255o may be asserted when $V_{MON}$ meets or falls below threshold boundary $OV_{RES}$, which also may compel switch circuit 110 into conductive state 309.

As illustrated in FIG. 3, the values assigned to process variable 310 and the state 305 of the switch circuit 110 for any value of process variable 310 defines a path in PV/State space 300, referred to herein as a process trajectory 350. It is to be understood that power controller 152 may embody multiple PV/State spaces 300, each with a corresponding process trajectory 350. In certain embodiments, process trajectory 350 includes multiple routes between states 305 to define thereby hysteresis curves, where the process will remain in one state over a range of values taken on by the process variable until another event boundary is encountered. Using the input voltage $V_{MON}$ exemplified above, power controller 152 may compel switch circuit 110 to remain in non-conducting state 307, having transitioned into that state 307 upon input voltage $V_{MON}$ reaching event boundary $OV_{CRIT}$, until the input voltage drops to a lower value, $OV_{RES}$ for example. At event boundary $OV_{RES}$, power controller 152 may compel switch circuit 110 into conducting state 309 and remain in conducting state 309 until an event boundary is encountered. In certain embodiments, the distance between routes in process trajectory 350 owing to hysteresis, representatively illustrated as distances $H_A$ and $H_B$, are user-selectable values.

It is to be understood that the present invention is not limited to the PV/State space illustrated in FIG. 3; process variables other than $V_{MON}$ and states other than switch conducting states may be implemented in embodiments of the present invention as well. For example, DC signals and non-sinusoidal, time-varying signals may serve as process variables and event actions compelled by events defined on such signals can include recording events in a data log, such as by data logger process 156 blinking/illuminating an LED on housing 12, sounding a buzzer or other audio annunciator, sending email by email service 157 and/or SNMP traps by SNMP service 159, and so on. Upon review of this disclosure, those with skill in the art will recognize numerous PV/State spaces and process trajectories therein that can be implemented in conjunction with the present invention without departing from the spirit and intended scope thereof.

Figure 4:
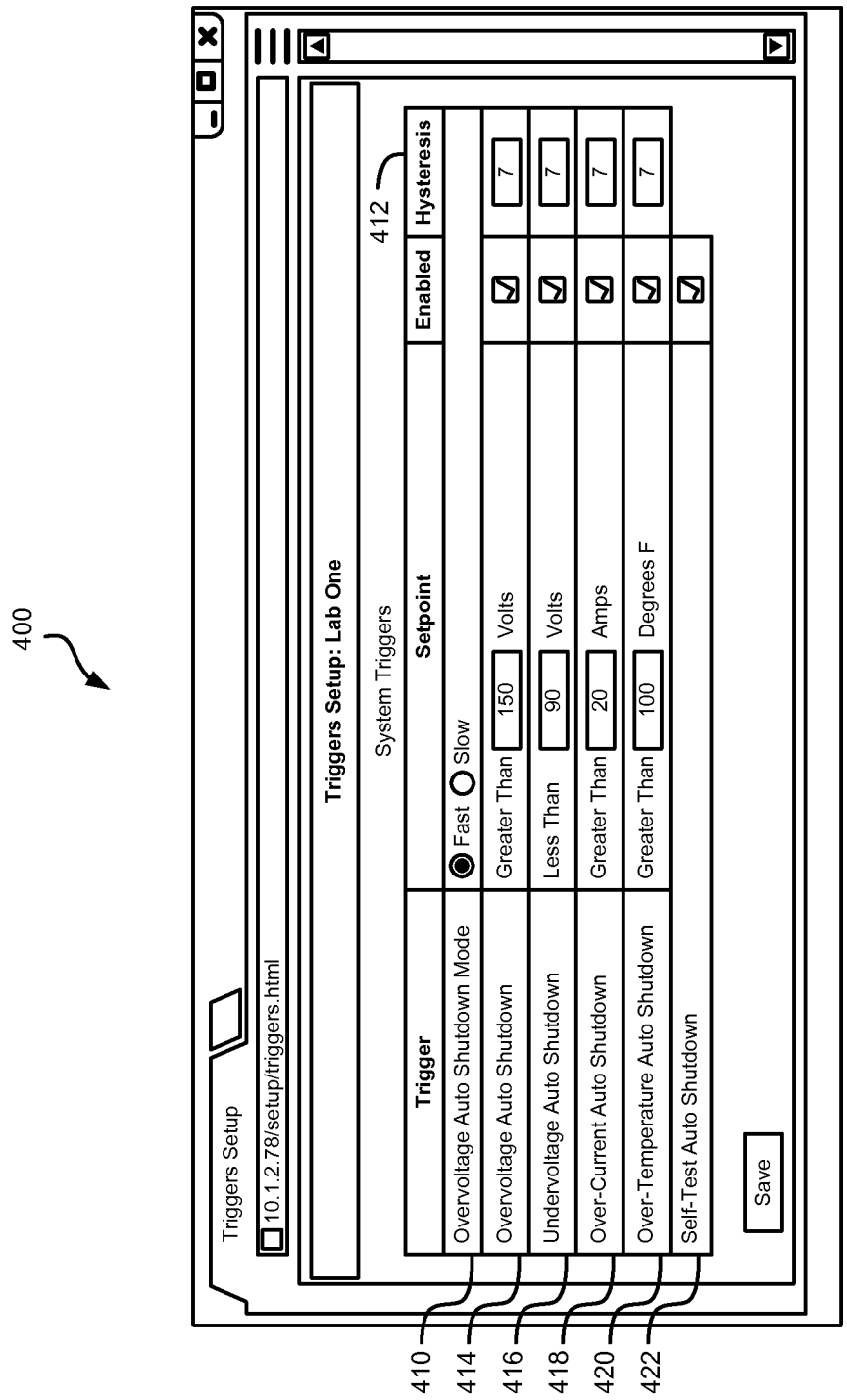
FIG. 4 is an illustration of a set of user controls in the form of a Web page by which user-defined control parameters may be entered in embodiments of the present general inventive concept.

FIG. 4 is a diagram of an exemplary user control interface 400 by which event boundaries and other parameters can be defined in embodiments of the present invention. In the example illustrated, the event boundaries are established through what are referred to herein as "system triggers." System triggers may include, without being limited to an overvoltage trigger set through overvoltage auto shutdown control 414, an undervoltage trigger set through undervoltage auto shutdown control 416, an overcurrent trigger set through overcurrent auto shutdown control 418, an overtemperature trigger set through over-temperature auto shutdown control 420, and a self-test failure trigger that is enabled/disabled through self-test failure auto shutdown control 422. A self-test failure trigger condition, when met, indicates a failure in the internal surge protection circuitry, in response to which switch circuit 110 is compelled into its non-conducting state.

System triggers define power event boundaries at which power controller 152 is to transition into a protective shutdown state in which switch circuit 110 is in its non-conducting or open state. For example, meeting an overvoltage trigger condition, where the AC line voltage rises above the value set in overvoltage auto shutdown control 414, an undervoltage trigger condition, where the AC line voltage falls below the value set in undervoltage auto shutdown control 416, an overcurrent trigger condition, where the total current draw exceeds the value set in overcurrent auto shutdown control 418, an over-temperature trigger condition, where the temperature sensed by a connected temperature sensor exceeds the value set in the over-temperature auto shutdown control 420, assert power events in power controller 152 in response to which switch circuit 110 is compelled into its non-conducting state to remove power from electrical loads connected at output port 30. Associated hysteresis controls 412 specify the amount by which the associated process variable must be removed from the trigger setpoint (closer to nominal) following a corresponding power event before the system trigger condition is to be considered clear. For example, using an overvoltage shutdown point of 150V and a hysteresis of 7, power controller 152 may enter a shutdown state when the line voltage exceeds 150V and will not leave the shutdown state until the line voltage drops below 150V−7V=143V.

Exemplary user control interface 400 includes a reaction mode control for overvoltage power events, i.e., overvoltage auto shutdown mode control 410, although similar reaction mode controls may be implemented for other system triggers. For purposes of generality, overvoltage auto shutdown mode control 410 will be referred to herein as reaction mode control 410. Reaction mode control 410 allows an operator to select the manner in which process variables, in this case input voltage $V_{MON}$, are assessed against respective event boundaries, in this case overvoltage auto shutdown voltage 414 to determine whether a power event has occurred.

Figure 5:
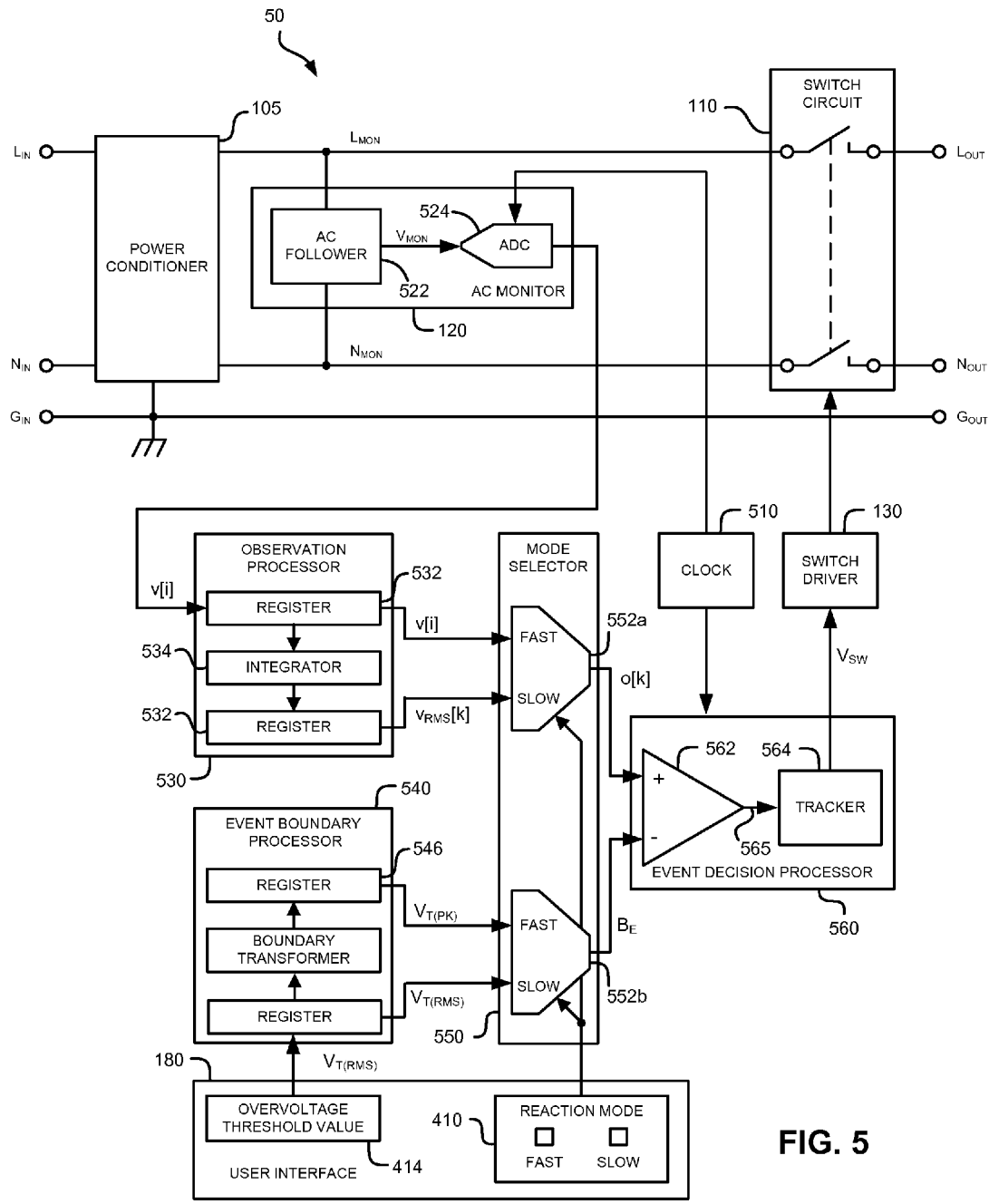
FIG. 5 is a functional block diagram of a power control implementation by which the present general inventive concept may be embodied.

FIG. 5 is a schematic block diagram of an exemplary PCCA 50 by which the present invention can be embodied. It is to be assumed that when viewed from a terminal characteristics point of view, exemplary PCCA 50 is functionally identical to PCCA 10 illustrated in FIG. 1. FIG. 5 exemplifies possible mechanisms and/or techniques by which features previously described can be implemented, particularly with regard to reaction mode operation. Components illustrated in FIG. 5 having like reference numerals as components in FIG. 1 are to be considered functionally equivalent to their FIG. 1 counterparts per their general descriptions provided above.

As previously described, monitor 120 may take measurements of conditioned input voltage $V_{MON}$, i.e., the AC voltage between $L_{MON}$ and $N_{MON}$. To that end, monitor 120 may include an AC follower 522 to produce a replica of the voltage $V_{MON}$ that is suitably scaled for digital sampling. AC follower 522 may be implemented through a variety of techniques including, but not limited to, transformers and/or buffering amplifiers. The replica of $V_{MON}$ may be sampled by a suitable analog-to-digital converter (ADC) 524, which generates a sequence of measurement values v[i] at a measurement (sample) rate established by a suitable clock circuit 510. For purposes of explanation, it is to be assumed that clock circuit 510 produces a measurement clock signal 512 that establishes the rate $[T_{MEAS}]^{-1}$ at which measurements v[i] are generated from $V_{MON}$ and a decision clock signal 514 that establishes the rate $[T_{DEC}]^{-1}$ at which power event decisions are made, as will be described below. In certain embodiments, measurement clock signal 512 and decision clock signal 514 are identical and may be conveyed on a common conductor. Additionally, the period $T_{MEAS}$ of measurement clock signal 512 and the period $T_{DEC}$ of decision clock signal 514 are smaller than the period of $V_{MON}$ or whatever signal is being measured, in accordance with sampling, measurement and decision requirements of the application for which PCCA 50 is implemented.

Figure 6:
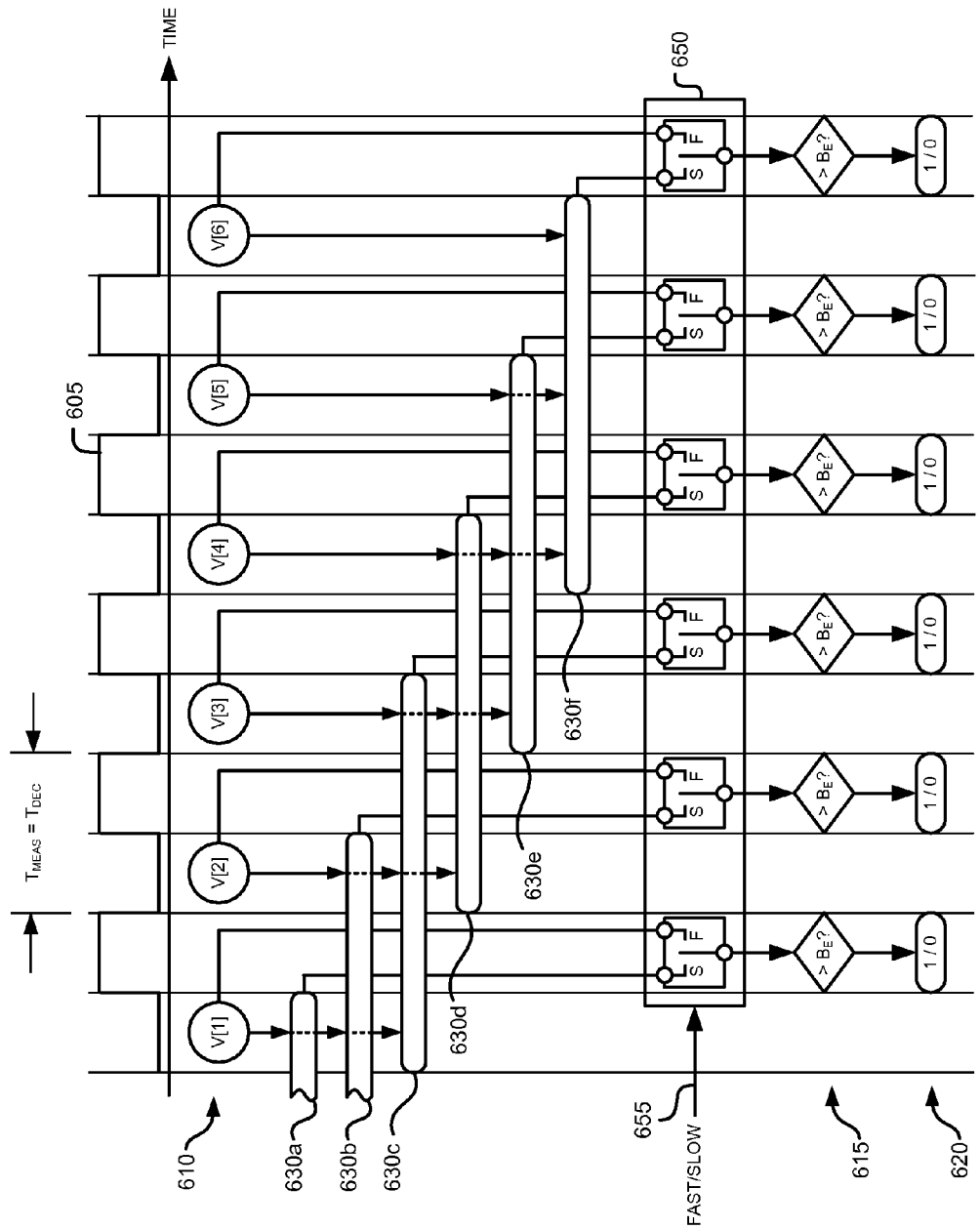
FIG. 6 is a diagram illustrating differences between event reaction modes in embodiments of the present general inventive concept.

Power controller 152 of exemplary PCCA 50 is constructed or otherwise configured to assert power events in accordance with one of two reaction modes: a "fast" reaction mode and a "slow" reaction mode. FIG. 6 is a diagram illustrating basic characteristics of these two reaction modes. For purposes of explanation, it is to be assumed that clock signal 605 is utilized as both measurement clock signal 512 and decision clock signal 514. As illustrated in the figure, measurements (samples) v[i], generally illustrated at measurements 610, are obtained in respective periods $T_{MEAS}$ of clock signal 605. Additionally, it is to be noted that a power event decision, generally illustrated at power event decisions 615, is performed in each period $T_{DEC}=T_{MEAS}$ of clock signal 605. A power event decision may be an assessment of one or more measurements against an event boundary condition $B_E$, the results of which are generally illustrated at power event decision results 620.

As illustrated in FIG. 6, a reaction mode control 650 is operated by a mode control signal 655, where, in the fast state of signal 655, the common terminal of the switches of reaction mode control 650 are connected to the "F" terminal and, in the slow state of signal 655, the common terminal of the switches of reaction mode control 650 are connected to the "S" terminal. In the fast reaction mode a power event decision 615 is performed on each process variable measurement 610. In the slow reaction mode, power event decision 615 is made over a set 630a-630f of process variable measurements 630. It is to be noted that, in the slow reaction mode, a power event decision 615 is prevented from being made on a single measurement 630, but is instead based on historical and/or filtered process variable data. By contradistinction, in the fast reaction mode, power event decisions 615 are based on immediate process variable data. It is to be understood that the present invention is not limited to two (2) reaction modes; those having skill in the power control arts will recognize other reaction mode implementations upon review of this disclosure. Additionally, the present invention is not limited to the processing on process variable sets 630a-630f by which the aggressiveness of the response to event boundary crossings is diminished for the slow mode. In certain embodiments, the sets 630a-630f are used to compute a root mean square (RMS) of v[i] taken over a particular time interval.

Returning now to FIG. 5, the reaction mode may be user-controlled through reaction mode control 410 implemented on user interface 180, as described above. User interface 180 may also be configured with threshold control 414 to accept, for example, a user-defined overvoltage threshold $V_T$. In certain embodiments, the threshold value $V_T$ is accepted by power controller 152 as an RMS threshold value, which is utilized for slow reaction mode event processing. The threshold value $V_T$ may be provided to register 542 of event boundary processor 540, which may include a boundary transformer 544 to convert, translate or otherwise modify units of measure (peak voltage, average voltage, RMS voltage, etc.) of the threshold value to match the units of measure of the measurement v[i]. In the illustrated example, the RMS value of $V_{T(RMS)}$ is converted to a peak value $V_{T(PK)}$ by boundary transformer 544, e.g., $$V_{T(PK)} = \sqrt{2} V_{T(RMS)}.$$

The converted threshold value $V_{T(PK)}$ may then be stored in register 546 for fast reaction mode event processing.

As illustrated in FIG. 5, measurement values v[i] are provided to an observation processor 530, where they may first be stored in a register 532. The value v[i] stored in register 532 is accepted by power controller 152 as an instantaneous measurement, which may be used for fast reaction mode event processing. For slow reaction mode event processing, v[i] stored in register 532 may be provided to integrator 534, which may generate a historically representative, filtered, averaged, integrated, etc., value, which may be stored in register 536. As stated above, integrator 534 may compute an RMS value $v_{RMS}[k]$ over N samples of v[i], e.g.:

$$v_{RMS}[k] = \sqrt{\frac{1}{N} \sum_{i=k}^{N+1-k} v[i]^2}.$$

The selection of reaction mode through reaction mode control 410 may be provided to mode selector 550, as representatively illustrated by mode selection signal 555. Mode selector 550 may be constructed or otherwise configured to provide at its output an observation o[k] and an event boundary $B_E$ based upon the reaction mode selected by the user through reaction mode control 410. For purposes of explanation, exemplary mode selector 550 comprises selector switches 552a-552b, representatively referred to herein as selector switch(es) 552, respectively coupled to observation processor 530 and event boundary processor 540. When so embodied, user-selection of the fast reaction mode provides, at the output of mode selector 550, v[i] as the observation o[k] and $V_{T(PK)}$ as the event boundary $B_E$. On the other hand, user-selection of the slow reaction mode provides, at the output of mode selector 550, $v_{RMS}[k]$ as the observation o[k] and $V_{T(RMS)}$ as the event boundary $B_E$.

As illustrated in FIG. 5, observations o[k] and event boundary $B_E$ may be provided to an event decision processor 560 by which event decisions are made. As one example implementation, event decision processor 560 may include a comparator 562 by which an observation o[k] is compared to event boundary $B_E$ in each period $T_{EC}$ of the decision clock signal 514. Comparator 562 may produce an output signal 565 that asserts an occurrence of a power event, e.g., by outputting a logical TRUE if the event boundary condition $B_E$ has been met, thus indicating that a power event has occurred, and by outputting a logical FALSE if the event boundary condition $B_E$ has not been met, thus indicating that a power event has not occurred. Event decision processor 560 may optionally include a tracker component 564 by which spurious triggering of the power events is ameliorated or avoided. For example, tracker 564 may assert the occurrence E of a power event only after two (2) or more consecutive TRUE power event decisions have been issued from comparator 562, i.e., $$E = \begin{cases} \text{TRUE}, & (o[k] \geq B_E) \,\&\, (o[k-1] \geq B_E) \\ \text{FALSE}, & \text{Otherwise} \end{cases}.$$

Event decision processor 560 of power controller 152 may generate switch signal $V_{SW}$ in a signal state based on whether a power event has occurred. In the example of FIG. 5 where the example power event is an input overvoltage event, a TRUE assertion of the event precipitates a state of $V_{SW}$ that compels switch driver 130 to open switch circuit 110. When no such event assertion exists, i.e., when E=FALSE, the state of $V_{SW}$ is such that switch driver 130 closes switch circuit 110.

Figure 7:
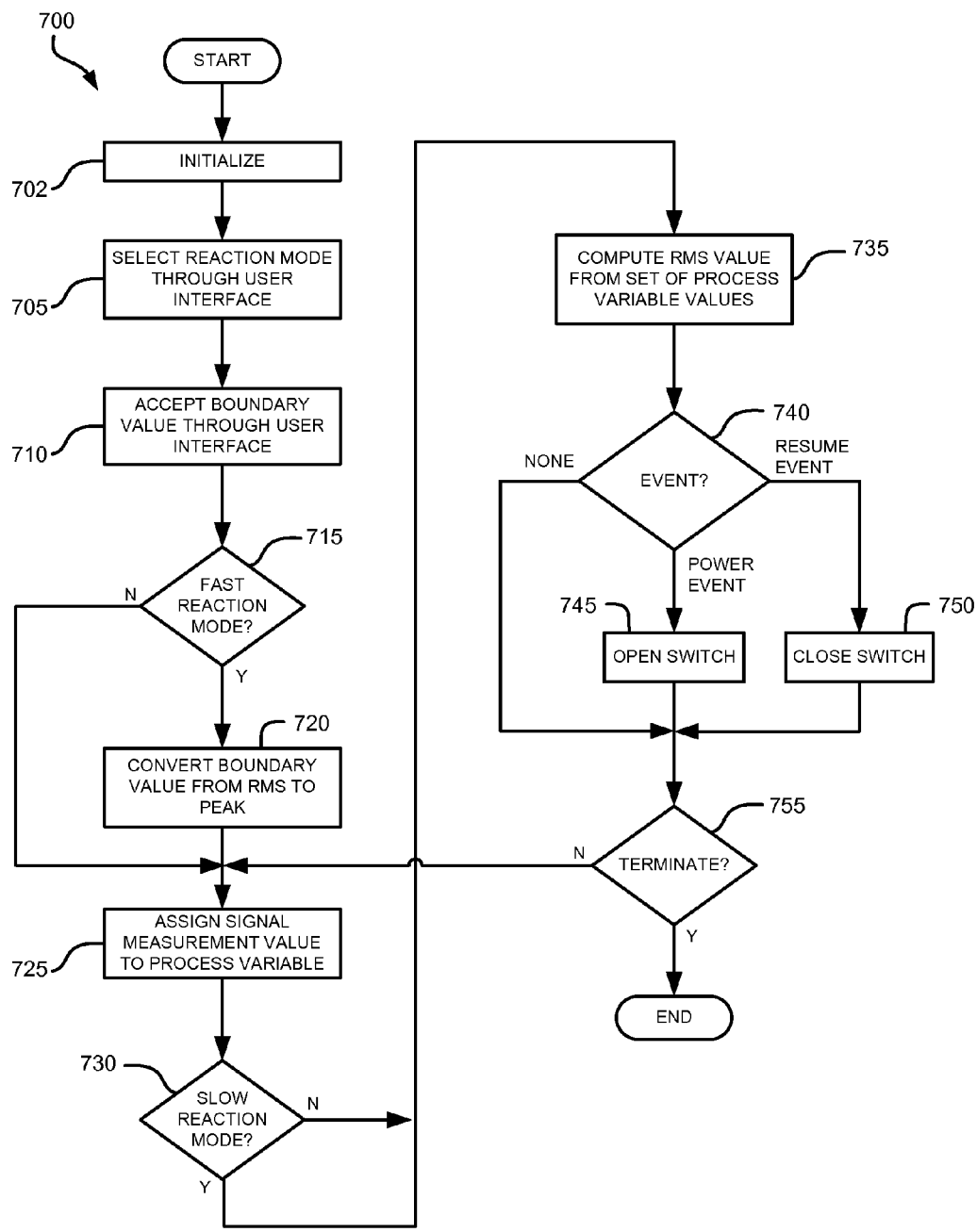
FIG. 7 is a flow diagram of a power control process by which the present general inventive concept may be embodied.

FIG. 7 is a flow diagram of an exemplary power control process 700 by which the present invention can be embodied. In the following description of power control process 700, it is to be assumed that the process variable is input voltage and that the boundary value entered by the user through the user interface is in RMS voltage units of measure. Those having skill in the art will recognize numerous variations and modifications to power control process 700 that can be realized without departing from the spirit and intended scope of the present invention.

In operation 702, various system parameters may be initialized including, but not limited to, default or previously stored reaction modes and/or event boundary values. In operation 705, a user may select a reaction mode through the user interface and, in operation 710, the user may define a boundary value, which is accepted by the power controller through the user interface. In operation 715, it is determined whether the fast reaction mode has been selected and, if so, process 700 may transition to operation 720 by which the boundary value is converted from RMS voltage units of measure to peak voltage units of measure. Otherwise, i.e., in the slow reaction mode, the boundary value is used in its RMS voltage units of measure. In operation 725, signal measurements made over time are assigned to the input voltage process variable. In operation 730, it is determined whether the user has selected the slow reaction mode. If so, an RMS voltage value is computed from a set of N process variable values; otherwise, each measurement as assigned to the process variable over time is assessed for determining whether a power event has occurred.

In operation 740, it is determined whether an event has occurred. As illustrated in FIG. 7, if a power event has occurred, process 700 transitions to operation 745 by which the switch circuit is opened and power is removed from attached loads. If, in operation 740, it is determined that a resume event has occurred, i.e., all conditions under which previously asserted power events have been cleared, process 700 transitions to operation 750 by which the switch circuit is closed and electrical power is provided to attached load equipment. Power control process 700 may then transition to operation 755, where it is determined whether the process is to be terminated. If the process is not terminated, process 700 transitions back to operation 725 and continues from that point.

Having described preferred embodiments of new and improved power-centric conditioning and control techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:
1. A power control apparatus comprising:
a user interface configured to accept from a user a selection of a reaction mode from a plurality of reaction modes, the reaction modes including a fast reaction mode by which each of a plurality of values assigned to a process variable over time are individually evaluated in an event decision that asserts an occurrence of a power event and a slow reaction mode by which none of the values assigned to the process variable over time are individually evaluated in the event decision that asserts the occurrence of the power event;
a monitor configured to assign measurements of a signal to the process variable as the values thereof; and
a power controller configured to:
evaluate the values assigned to the process variable against an event boundary in accordance with the selected reaction mode as the event decision that asserts the occurrence of the power event; and
compel a transition between operational states in the power control apparatus in response to the occurrence of the power event.
2. The apparatus of claim 1, wherein the user interface further comprises:
a boundary value control configured to accept a boundary value that demarcates acceptable and abhorrent ranges of the process variable, wherein the power controller is further configured to compute the event boundary from the boundary value in accordance with the selected reaction mode.

3. The apparatus of claim 2, wherein the power controller is configured to compute the event boundary by modifying the boundary value to match units of measure of the process variable for the selected reaction mode.

4. The apparatus of claim 3, wherein the power controller is configured to modify the boundary value by modifying a root mean squared boundary value into a peak event boundary value responsive to affirming that the selected reaction mode is the fast reaction mode.

5. The apparatus of claim 1, wherein the power controller is further configured to:
compare each value of the process variable against the event boundary responsive to affirming that the selected reaction mode is the fast reaction mode; and
compare a value computed from a set of values of the process variable against the event boundary responsive to affirming that the selected reaction mode is the slow reaction mode.

6. The apparatus of claim 1, wherein the monitor is further configured to:
generate samples of the signal at a rate by which the signal is substantially duplicated in the samples; and
assign the generated samples to the process variable over time.

7. The apparatus of claim 1, further comprising:
a quality tracker to postpone the state transition in the switch circuit until more than one power events has occurred.

8. The apparatus of claim 1, wherein the process variable is one of input voltage, output voltage, input current, output current, power consumption or temperature.

9. The apparatus of claim 1, wherein the processor is further configured to:
compel, as the transition between operational states in the power control apparatus, a transition between conducting and non-conducting states in a switch circuit in response to the occurrence of the power event.

10. The apparatus of claim 1, wherein the processor is further configured to:
compel, as the transition between operational states in the power control apparatus, at least one of the following:
a transition between audio or visual states in an annunciator in response to the occurrence of the power event;
a transition between entry and non-entry states in a data logger in response to the occurrence of the power event; and
a transition between messaging and non-messaging states in at least one of an email service and a simple network management protocol (SNMP) service in response to the occurrence of the power event.

11. A method of power control comprising:
accepting, through a user interface, a selection of a reaction mode from a plurality of reaction modes that include a fast reaction mode by which each of a plurality of values assigned to a process variable over time are individually evaluated in an event decision that asserts an occurrence of a power event in a power controller and a slow reaction mode by which none of the values assigned to the process variable over time are individually evaluated in the event decision that asserts the occurrence of the power event;
assigning measurements of a signal monitored by the power controller to the process variable as the values thereof;
evaluating the values assigned to the process variable against an event boundary in accordance with the selected reaction mode as the event decision that asserts the occurrence of the power event; and
compelling a transition between operational states in the power controller in response to the occurrence of the power event.

12. The method of claim 11, further comprising:
accepting, through the user interface, a boundary value that demarcates acceptable and abhorrent ranges of the process variable; and
computing the event boundary from the boundary value in accordance with the selected reaction mode.

13. The method of claim 12, wherein computing the event boundary comprises modifying the boundary value to match units of measure of the process variable for the selected reaction mode.

14. The method of claim 13, wherein modifying the boundary value comprises modifying a root mean squared boundary value into a peak event boundary value responsive to affirming that the selected reaction mode is the fast reaction mode.

15. The method of claim 11, wherein evaluating the values assigned to the process variable comprises:
comparing each value of the process variable against the event boundary responsive to affirming that the selected reaction mode is the fast reaction mode; and
comparing a value computed from a set of values of the process variable against the event boundary responsive to affirming that the selected reaction mode is the slow reaction mode.

16. The method of claim 11, wherein compelling the transition comprises:
compelling the transition between conducting and non-conducting states in a switch circuit in response to the occurrence of the power event.

17. A tangible, non-transient computer readable medium having encoded thereon processor instructions that, when executed by a processor, causes the processor to:
accept, through a user interface, a selection of a reaction mode from a plurality of reaction modes that include a fast reaction mode by which each of a plurality of values assigned to a process variable over time are individually evaluated in an event decision that asserts an occurrence of a power event in a power controller and a slow reaction mode by which none of the values assigned to the process variable over time are individually evaluated in the event decision that asserts the occurrence of the power event;
assign measurements of a signal monitored by the power controller to the process variable as the values thereof;
evaluate the values assigned to the process variable against an event boundary in accordance with the selected reaction mode as the event decision that asserts the occurrence of the power event; and
compel a transition between operational states in the power controller in response to the occurrence of the power event.

18. The computer readable medium of claim 17 having additional processor instructions encoded thereon that cause the processor to:
accept, through the user interface, a boundary value that demarcates acceptable and abhorrent ranges of the process variable; and
compute the event boundary from the boundary value in accordance with the selected reaction mode.

19. The computer readable medium of claim 17, having additional processor instructions encoded thereon that cause the processor to:
 compare each value of the process variable against the event boundary responsive to affirming that the selected reaction mode is the fast reaction mode; and
 compare a value computed from a set of values of the process variable against the event boundary responsive to affirming that the selected reaction mode is the slow reaction mode.

20. The computer readable medium of claim 17 having additional processor instructions encoded thereon that cause the processor to:
 compel the transition between conducting and non-conducting states in a switch circuit in response to the occurrence of the power event.

\* \* \* \* \*